US010847016B1

(12) United States Patent
De Jesus

(10) Patent No.: US 10,847,016 B1
(45) Date of Patent: Nov. 24, 2020

(54) EYEGLASSES WITH FINDER

(71) Applicant: Tatiana De Jesus, Bridgeport, CT (US)

(72) Inventor: Tatiana De Jesus, Bridgeport, CT (US)

( * ) Notice: Subject to any disclaimer, the term of this patent is extended or adjusted under 35 U.S.C. 154(b) by 0 days.

(21) Appl. No.: 16/566,973

(22) Filed: Sep. 11, 2019

(51) Int. Cl.

| | |
|---|---|
| ***H04L 29/06*** | (2006.01) |
| ***G08B 21/24*** | (2006.01) |
| ***G08B 5/36*** | (2006.01) |
| ***H04R 17/00*** | (2006.01) |
| ***G08B 7/06*** | (2006.01) |
| ***G08B 3/10*** | (2006.01) |

(52) U.S. Cl.
CPC ............... *G08B 21/24* (2013.01); *G08B 3/10* (2013.01); *G08B 5/36* (2013.01); *G08B 7/06* (2013.01); *H04R 17/00* (2013.01)

(58) Field of Classification Search
CPC . G08B 21/24; G08B 5/36; G08B 7/06; G08B 3/10; H04R 17/00; G02C 11/10; G02C 5/14; G02C 7/083; G06F 3/044
See application file for complete search history.

(56) References Cited

U.S. PATENT DOCUMENTS

| | | | | |
|---|---|---|---|---|
| 4,209,234 A * | 6/1980 | McCooeye | G02C 11/08 | 219/211 |
| 4,254,451 A * | 3/1981 | Cochran, Jr. | A44C 15/0015 | 362/103 |
| 5,949,516 A | 9/1999 | McCurdy | | |
| 7,362,222 B1 * | 4/2008 | Holz | G08B 21/24 | 340/539.32 |
| 7,380,936 B2 | 6/2008 | Howell et al. | | |
| 8,979,295 B2 | 3/2015 | Waters | | |
| 9,946,097 B2 * | 4/2018 | Willey | G02C 7/083 | |
| 2006/0001827 A1 * | 1/2006 | Howell | G02C 11/10 | 351/41 |
| 2010/0201938 A1 * | 8/2010 | Jackson | G02C 11/10 | 351/158 |
| 2010/0309426 A1 * | 12/2010 | Howell | G02C 5/146 | 351/158 |
| 2011/0058141 A1 * | 3/2011 | Cozzani | G02C 11/04 | 351/158 |
| 2014/0313033 A1 | 10/2014 | Ariely | | |
| 2016/0191511 A1 * | 6/2016 | Tijerina | A61B 5/0402 | 726/7 |
| 2020/0015745 A1 * | 1/2020 | Saito | A61B 5/14517 | |

OTHER PUBLICATIONS

The Lost Glasses Locator. Product Listing [online]. Copyright 2019 Hammacher Schlemmer & Company, Inc. [retreived on Apr. 2, 2019]. Retrieved form the Intgernet: <URL: https://www.hammacher.com/product/lost-glasses-locator?promo=search&cmp=cel&trigger=ac&query=lost>.

Orbit Glasses Bluetooth Tracker. Product Listing [online]. © 2019 Adorama Camera, Inc [retreived on Apr. 2, 2019]. Retrieved form the Intgernet: <URL: https://www.adorama.com/orbitglasses.html>.

Never Lose Your Glasses Again with the Look Finder. Video [online]. Published by Associated Newspapers Ltd © dmg media, [retreived on Apr. 2, 2019]. Retrieved form the Intgernet: <URL: https://www.dailymail.co.uk/video/sciencetech/video-1117919/Never-lose-glasses-The-Look-Finder.html>.

* cited by examiner

*Primary Examiner* — An T Nguyen
(74) *Attorney, Agent, or Firm* — Cramer Patent & Design, PLLC; Aaron R. Cramer

(57) ABSTRACT

An alarm device configured to secure about a portion of a pair of eyeglasses includes an audio alarm in electrical communication with a power source and a heat sensor strip. The heat sensor strip activates the audio alarm when no longer heated by the body heat of a user.

20 Claims, 4 Drawing Sheets

EYEGLASSES WITH FINDER

RELATED APPLICATIONS

Not applicable.

FIELD OF THE INVENTION

The present invention relates generally to eyeglasses with a finder.

BACKGROUND OF THE INVENTION

Nothing is perhaps more frustrating than not being able to find common personal items that you just had in your hand minutes ago. These items include keys, remote controls, cell phones, toys, and similar objects. They become easily lost due to their small size, often falling in between seat cushions or under furniture, with no means to easily locate them. Other times, they may be accidentally carried from the room and left elsewhere in the home.

However, there is perhaps no object more frustrating to lose than perhaps that of a pair of eyeglasses. Without them, it is virtually impossible to find anything else as the user's eyesight is often diminished to the point of only being able to see for a few feet in front of them. As such, the aggravation associated with finding a pair of eyeglasses is multiplied greatly when compared to other lost items. Accordingly, there is a need for a means by which eyeglasses can be easily found when misplaced. The development of the Eyeglasses with Finder fulfills this need.

SUMMARY OF THE INVENTION

The principles of the present invention provide for a location finding device which comprises an input control device which includes a power switch and a volume selection switch. The power switch is used to activate and deactivate the location finding device and the volume selection switch allows for control of an audio level produced by the location finding device. The location finding device also comprises an output control device which includes a speaker and a light-emitting diode and an enclosure having a pair of open ends to allow the location finding device to contain a plurality of external and internal components. The location finding device slips over a free end of an earpiece. The location finding device also comprises an inner face of the enclosure which is provided with a temperature sensitive switch and a battery. The temperature sensitive switch is provided at a forward portion of the enclosure such that it is in contact with the skin of the user while a pair of glasses are worn.

The location finding device is mounted on the earpiece of the pair of glasses. The power switch may be engaged once to activate the location finding device and a subsequent engagement to deactivate the location finding device. The volume selection switch may be engaged once for a low volume level and engaged again for a high-volume level in a repetitive cycle. The location finding device may be activated and deactivated in a similar repetitive cycle. The power switch is visible on an outer face of the enclosure. The speaker may include a small piezoelectric design that produces a shrill sound that is easy to hear and locate. The light-emitting diode may include a high-brightness design that makes the location finding device easy to locate. The speaker may be visible on an outer face of the enclosure. The light-emitting diode may be visible on an outer face of the enclosure.

The enclosure may have a hollow design and may be friction fit over the free end of the earpiece. The enclosure may be made of plastic and may have glow-in-the-dark properties to help aid in finding the location finding device.

One or more phosphors may be mixed in with the plastic and may include doped strontium aluminate. The temperature sensitive switch may allow a user replacement of the battery. Contact of the skin of the user may be near the temple areas of the user. The temperature sensitive switch may be in an open state when in contact with the user's skin and the temperature sensitive switch may be in a closed state when away from contact with the user's skin.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
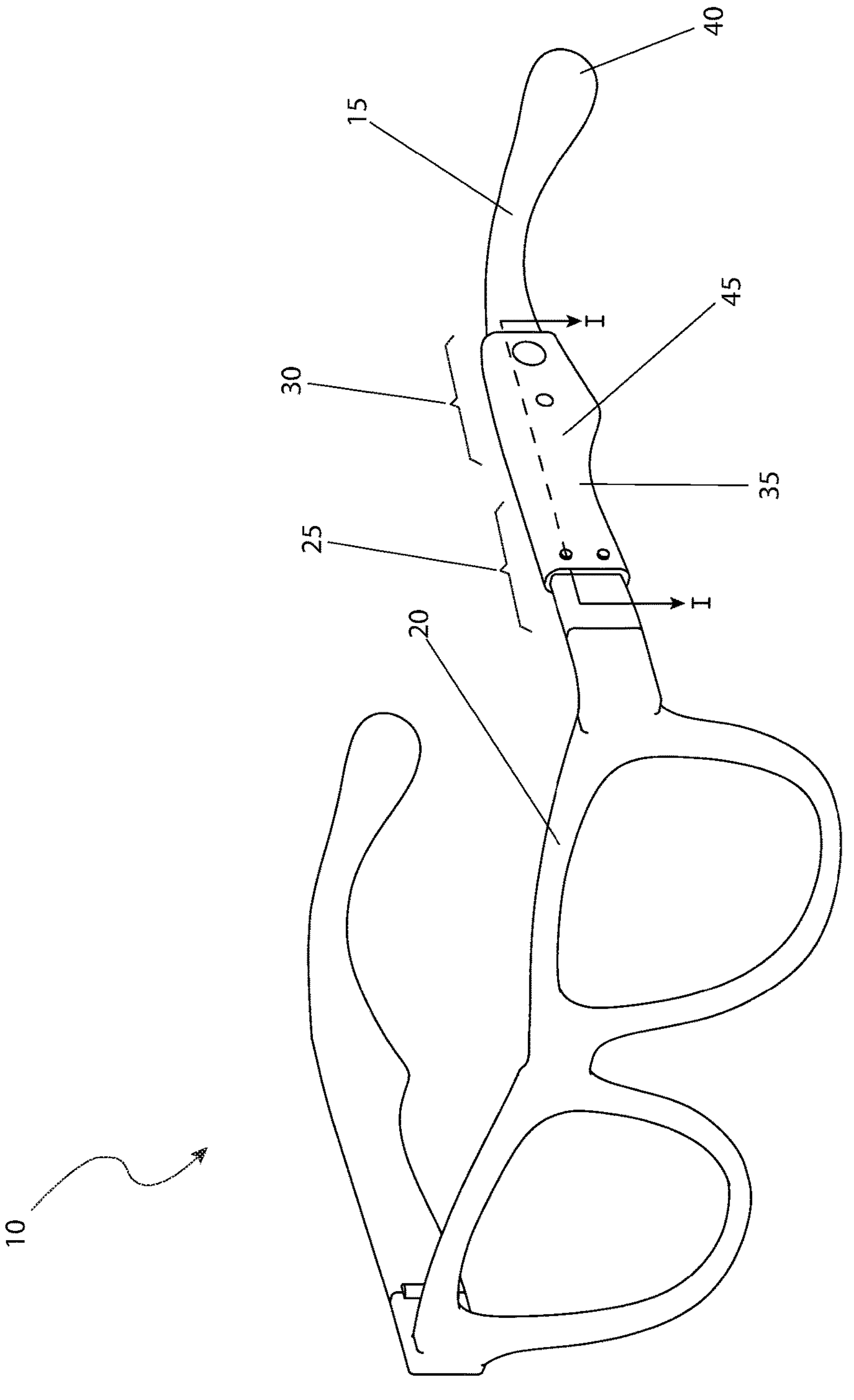
FIG. 1 is a perspective view of the location finding device 10, according to the preferred embodiment of the present invention.

10 location finding device
15 earpiece
20 eyeglasses
25 input control device
30 output control device
35 enclosure
40 free end
45 phosphor
50 open end
55 power switch
60 volume selection switch
65 speaker
70 light-emitting diode (LED)
75 outer face
80 inner face
85 battery access cover
90 temperature sensitive switch
95 battery
100 dropping resistor

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms “a” and “an” herein do not denote a limitation of quantity, but rather denote the presence of at least one (1) of the referenced items.

1. Detailed Description of the Figures

Referring now to FIG. 1, a perspective view of the location finding device 10, according to the preferred embodiment of the present invention is disclosed. The location finding device 10 (herein also described as the “device”) 10, is shown mounted on the earpiece 15 of a pair of eyeglasses 20. The eyeglasses 20 depicted are for illustrative purposes only, as the device 10 will function on almost any type or style of eyeglasses 20. Additionally, while the device 10 is shown on the left earpiece 15, it is realized by those skilled in the art that the device 10 will function on the right earpiece 15 as well. Thus, the earpiece 15 on which the device 10 is utilized, is not intended to be a limiting factor of the present invention.

The forward portion (nearest the lenses) includes an input control device 25, while the rearward portion contains output control devices 30 both the input control device 25 and the output control devices 30 will be described in greater detail herein below. All of the external and internal components are contained within an enclosure 35. The enclosure 35 is of a hollow design which slips over the free end 40 of the earpiece 15 and is positioned at the approximate endpoint as shown. The enclosure 35 is held in place via friction fit. The enclosure 35 is envisioned to be formed of plastic which has glow-in-the-dark properties to help aid in the location of the device 10 in low or no light environments. These properties would be formed by the use of phosphors 45 that are mixed in with the plastic during the injection molding process. An example of a suitable phosphor would be strontium aluminate (SrAl2O4) or similar chemical that is doped.

Figure 2:
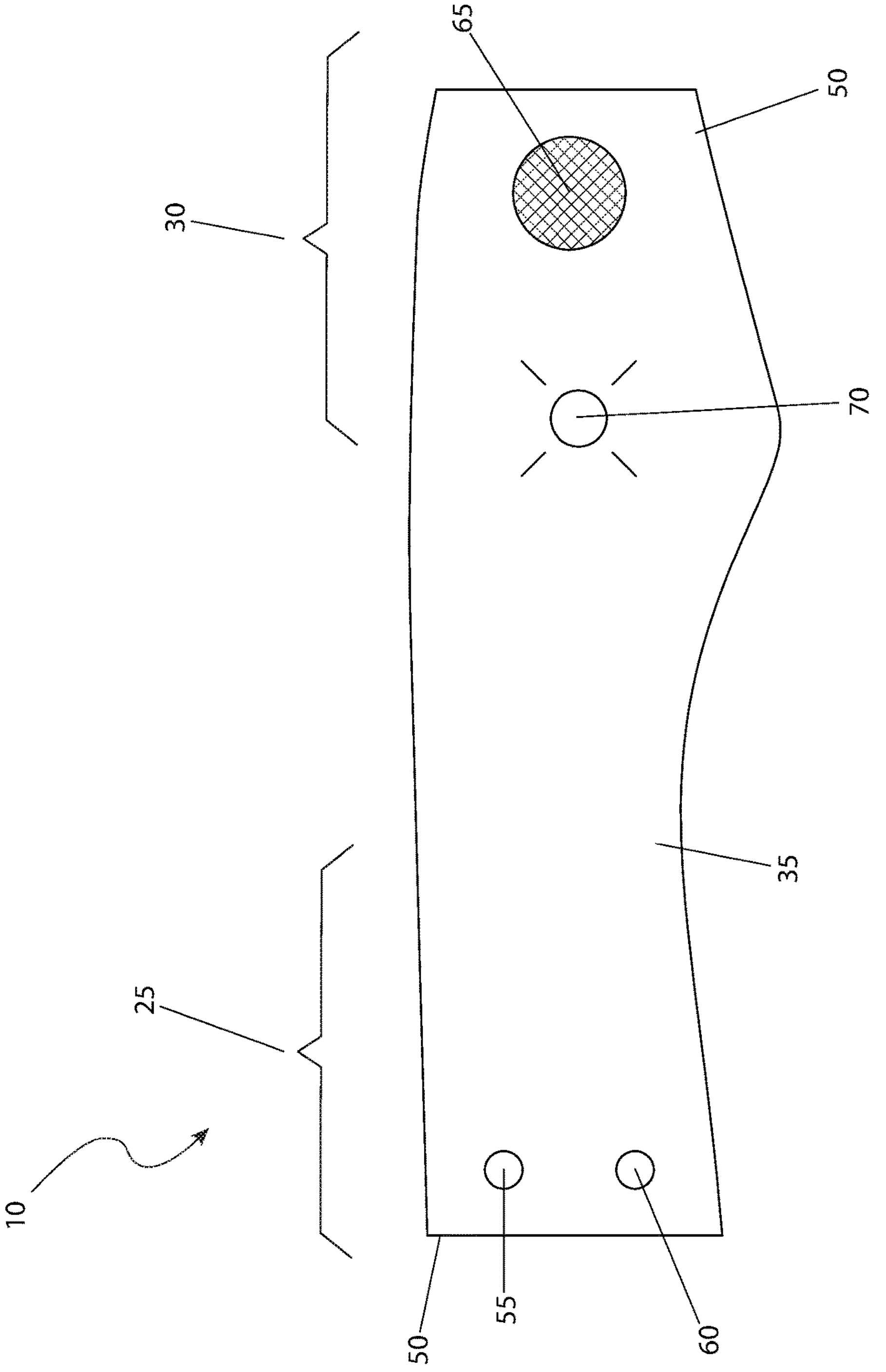
FIG. 2 is a front view of the location finding device 10, according to the preferred embodiment of the present invention.

Referring next to FIG. 2, a front view of the device 10, according to the preferred embodiment of the present invention is depicted. This view provides additional clarification on the input control device 25 and the output control devices 30 as used with the device 10. As aforementioned described, the enclosure 35 is provided with open ends 50 to allow the device 10 to be placed on an earpiece 15 (as shown in FIG. 1). The input control device 25 may include a power switch 55 and a volume selection switch 60. The power switch 55 is used to activate and deactivate the device 10 and is of maintained contact design. Such design allows the power switch 55 to be engaged once to activate the device 10 and a subsequent engagement deactivate the device 10, which can then be activated and deactivated in a similar repetitive cycle. The volume selection switch 60 allows for the control of the audio level produced by the device 10 and is of a maintained contract design. Similar to the power switch 55, this design allows for the volume selection switch 60 to be engaged once for a low volume level and engaged again for a high-volume level in a repetitive cycle. The output control devices 30 devices may include a speaker 65 and a light-emitting diode (LED) 70. It is envisioned that the speaker 65 would be of a small piezoelectric design that produces a shrill sound that is easy to hear and locate, even in high ambient noise level locations. The LED 70 is of a high-brightness design that will make the device 10 easy to locate, even in high ambient light levels.

Figure 3:
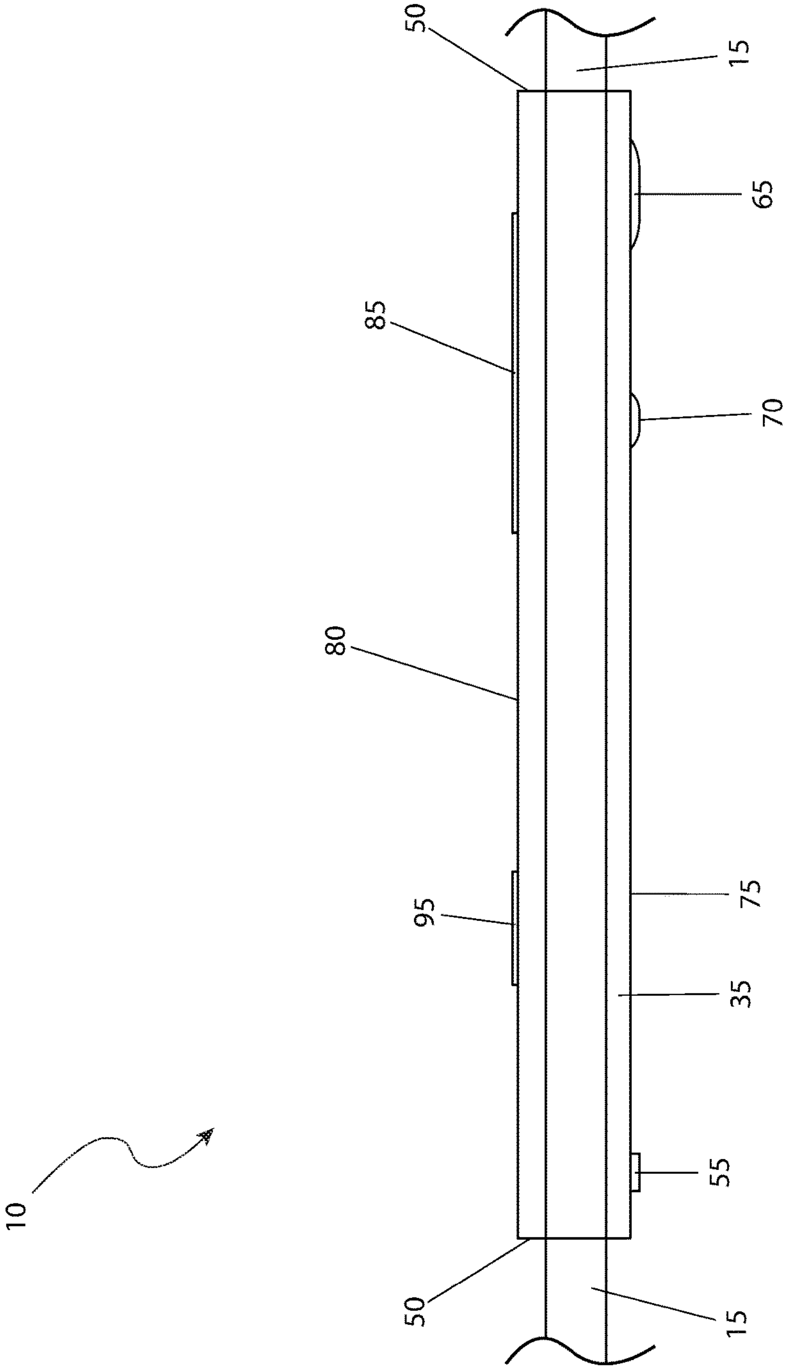
FIG. 3 is a sectional view of the location finding device 10, as seen along a line I-I, as shown in FIG. 1, according to the preferred embodiment of the present invention; and, FIG. 4 is an electrical block diagram of the location finding device 10, according to the preferred embodiment of the present invention.

Referring now to FIG. 3, a sectional view of the device 10, as seen along a line I-I, as shown in FIG. 1, according to the preferred embodiment of the present invention is shown. The earpiece 15 is shown routed through the two (2) open ends 50 of the enclosure 35. The power switch 55, the speaker 65 and the LED 70 are visible on the outer face 75 as aforementioned described. The inner face 80 of the enclosure 35 is provided with a temperature sensitive switch 90 and a battery 95. The temperature sensitive switch 90 allows user replacement of a battery 95 (not shown due to illustrative limitations). The temperature sensitive switch 90 is provided at the forward portion of the enclosure 35 such that it would contact the skin of the user (near the temple areas) while the eyeglasses 20 (as shown in FIG. 1) are being worn. When in contact with the user’s skin, the temperature sensitive switch 90 would be in an open state. When away from the user’s skin (e.g., the state of the eyeglasses 20 not being worn) the temperature sensitive switch 90 would be in a closed state.

Figure 4:
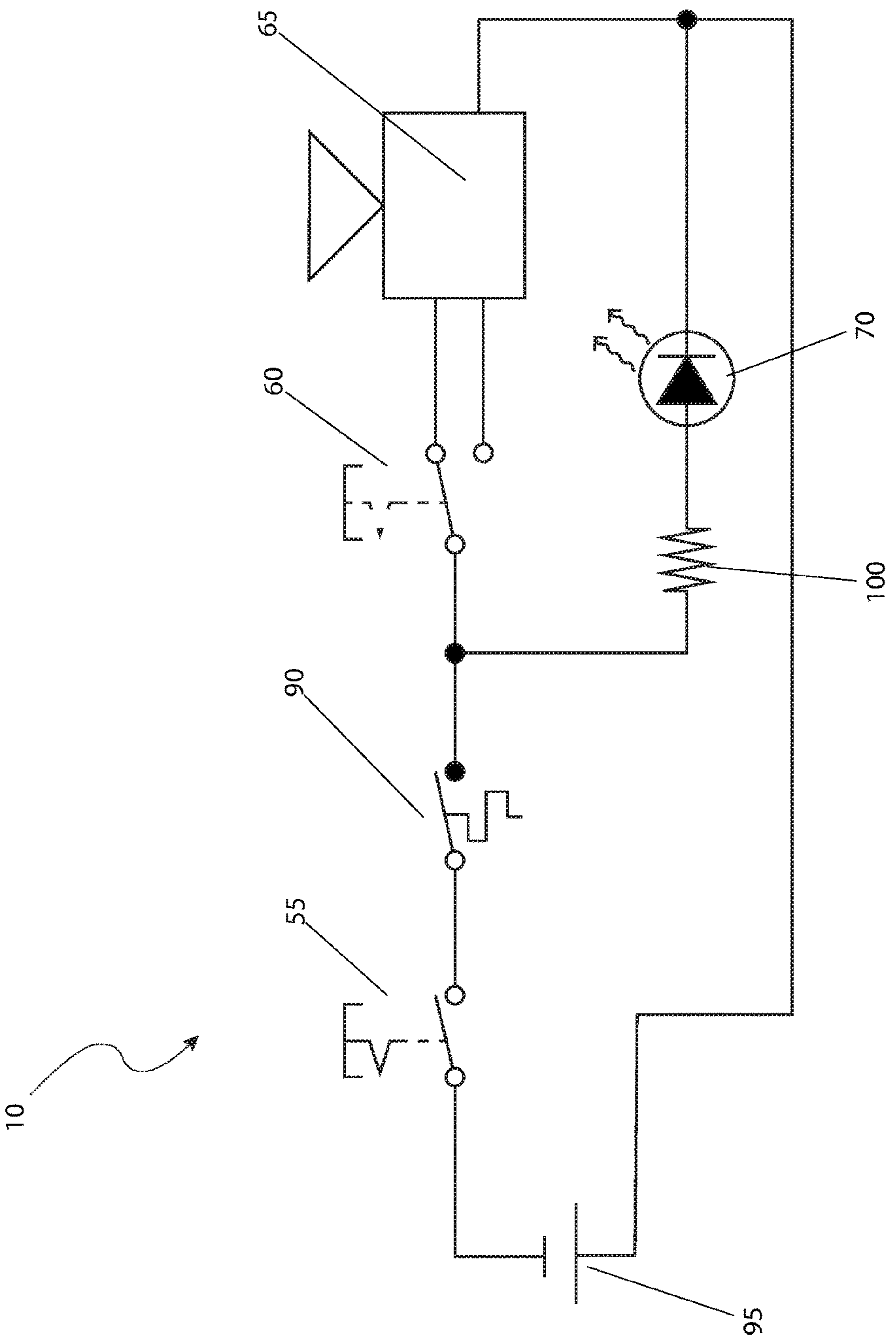

Referring finally to FIG. 4, an electrical block diagram of the device 10, according to the preferred embodiment of the present invention is disclosed. Electrical power for the device 10 is derived from the battery 95, envisioned to be a low-profile coin cell-style battery. Power is controlled by the power switch 55. It is envisioned that under normal use, the power switch 55 would be in an ON state. The power switch 55 would be placed in an OFF state during long periods of non-use, such as while sleeping. The resultant controlled power is then sent to the temperature sensitive switch 90 which provides for further control of the device 10. When in contact with the user’s skin, the temperature is envisioned to rise thus opening the circuit. This will remove power from the remaining electrical devices of the device 10. When away from the user’s skin, the temperature will cool down, thus closing the temperature sensitive switch 90, and passing power to the LED 70, through a dropping resistor 100 which is then illuminated. In a parallel circuit path, power is also passed to the volume selection pushbutton switch 60, which dependent on the position, will activate a high-volume level or low volume level in the speaker 65.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 through normal procurement channels such as discount stores, department stores, electronic stores, mail order and internet stores and the like. Special attention would be paid to the overall color of the enclosure 35 to suit individual user taste, as well as left hand or right-hand placement on the earpiece 15 of the eyeglasses 20.

After procurement and prior to utilization, the device 10 would be prepared in the following manner: a battery 95 would be placed within the battery access cover 85; the open end 50 of the enclosure 35 would be placed over the free end 40 of the earpiece 15; and the device 10 would be activated by engaging the power switch 55 once.

During utilization of the device 10, the following procedure would be initiated: provided the eyeglasses 20 remain on the user's head, no action should take place. Should the eyeglasses 20 be removed, the temperature sensitive switch 90 will immediately begin to cool; once cooled, the temperature sensitive switch 90 will activate the speaker 65 at a high or low volume setting depending on the position of the volume selection switch 60, as well as the LED 70. The audible and visual indication will make location of the device 10 along with the eyeglasses 20 easier, especially for those with poor vision or location in low light environments. Once located, placing the eyeglasses 20 back on one's head will heat the temperature sensitive switch 90 causing the circuit to open, thus deactivating the speaker 65 and the LED 70. The speaker 65 and the LED 70 may also be deactivated by pressing the power switch 55.

After use of the device 10, it may be deactivated by pressing the power switch 55, such as while sleeping at night, or for other long periods of time when the user does not require the use of eyeglasses 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

The invention claimed is:

1. A location finding device, comprising:

an input control device including a power switch and a volume selection switch, the power switch is used to activate and deactivate the location finding device and the volume selection switch allows for control of an audio level produced by the location finding device;

an output control device including a speaker and a light-emitting diode;

an enclosure having a pair of open ends to allow the location finding device to contain a plurality of external and internal components, wherein the location finding device slips over a free end of an earpiece; and an inner face of the enclosure provided with a temperature sensitive switch and a battery, the temperature sensitive switch is provided at a forward portion of the enclosure such that it is in contact with the skin of the user while a pair of glasses are worn.

2. The location finding device according to claim 1, wherein the location finding device is mounted on the earpiece of the pair of glasses.

3. The location finding device according to claim 1, wherein the power switch is engaged once to activate the location finding device and a subsequent engagement to deactivate the location finding device.

4. The location finding device according to claim 1, wherein the volume selection switch is engaged once for a low volume level and engaged again for a high-volume level in a repetitive cycle.

5. The location finding device according to claim 1, wherein the location finding device is activated and deactivated in a similar repetitive cycle.

6. The location finding device according to claim 1, wherein the power switch is visible on an outer face of the enclosure.

7. The location finding device according to claim 1, wherein the speaker includes a small piezoelectric design that produces a shrill sound that is easy to hear and locate.

8. The location finding device according to claim 1, wherein the light-emitting diode includes a high-brightness design that makes the location finding device easy to locate.

9. The location finding device according to claim 1, wherein the speaker is visible on an outer face of the enclosure.

10. The location finding device according to claim 1, wherein the light-emitting diode is visible on an outer face of the enclosure.

11. The location finding device according to claim 1, wherein the enclosure has a hollow design.

12. The location finding device according to claim 1, wherein the enclosure is friction fit over the free end of the earpiece.

13. The location finding device according to claim 1, wherein the enclosure is made of plastic.

14. The location finding device according to claim 13, wherein the enclosure has glow-in-the-dark properties to help aid in finding the location finding device.

15. The location finding device according to claim 14, wherein one or more phosphors are mixed in with the plastic.

16. The location finding device according to claim 15, wherein the one or more phosphors include doped strontium aluminate.

17. The location finding device according to claim 1, wherein the temperature sensitive switch allows user replacement of the battery.

18. The location finding device according to claim 1, wherein contact of the skin of the user is near the temple areas of the user.

19. The location finding device according to claim 1, wherein the temperature sensitive switch is in an open state when in contact with the user's skin.

20. The location finding device according to claim 1, wherein the temperature sensitive switch is in a closed state when away from contact with the user's skin.

* * * * *